Fig. 3
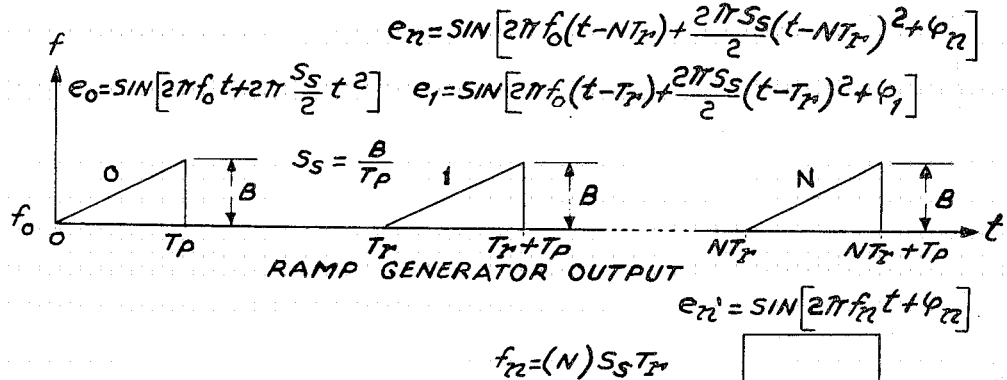
RAMP GENERATOR OUTPUT
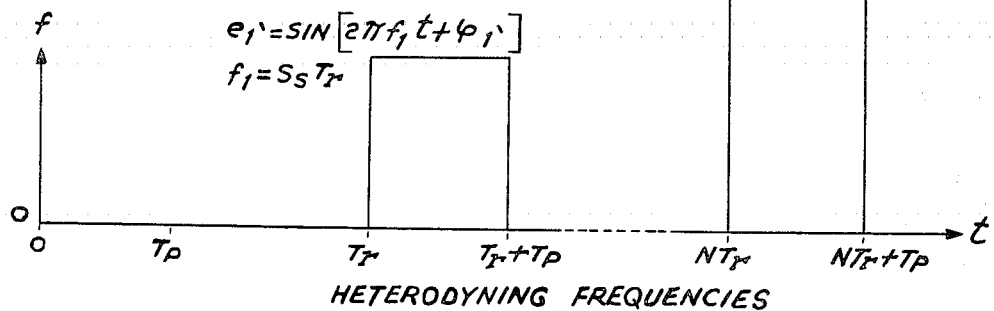
HETERODYNING FREQUENCIES
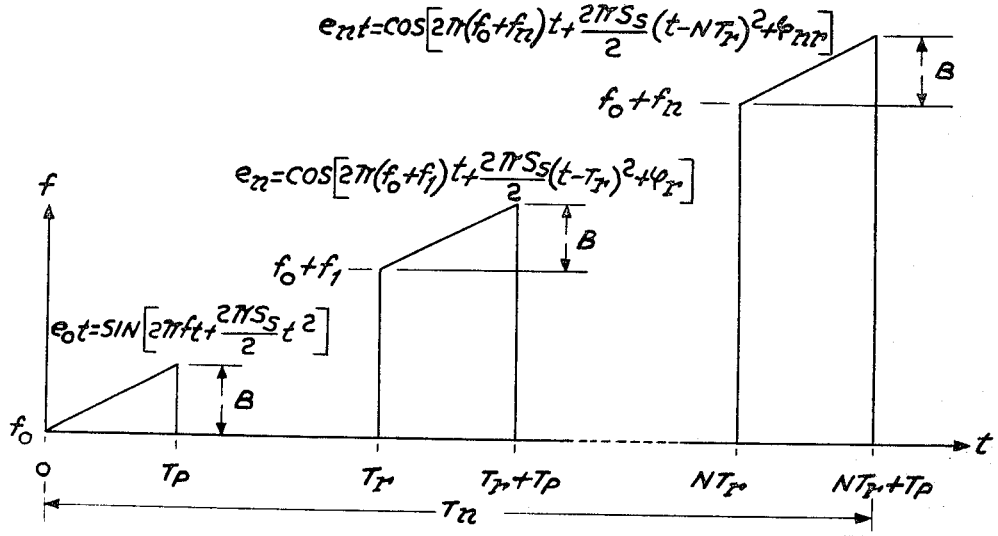

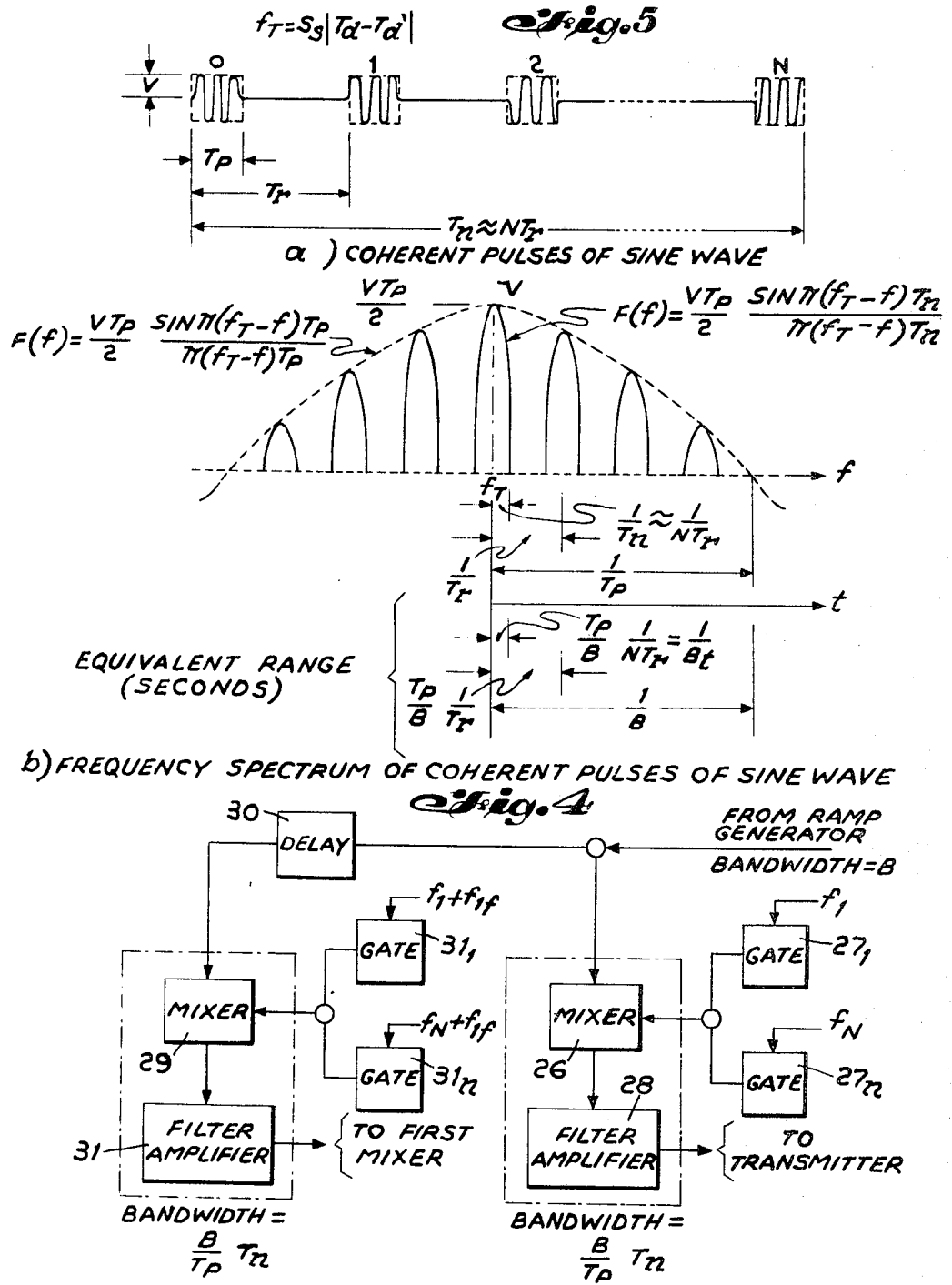

United States Patent Office

3,355,734
Patented Nov. 28, 1967

3,355,734
COHERENT FM RAMP RANGING SYSTEM
Damian F. Albanese, Chatsworth, Calif., assignor to International Telephone and Telegraph Corporation, Nutley, N.J., a corporation of Maryland
Filed Apr. 18, 1966, Ser. No. 543,356
9 Claims. (Cl. 343—14)

ABSTRACT OF THE DISCLOSURE

A phase coherent FM ramp ranging system employing a series of short ramps which correspond to portions of a long ramp. The short ramps are transmitted and the echo is heterodyned with a second series of short ramps generated in the receiver to produce a phase coherent pulsed sinewave, the frequency of which is a measure of the relative positions of the first and second series of ramps and is proportional to target range.

---

This invention relates to a radar ranging system and more particularly to a phase coherent FM ramp radar ranging system.

It is well known that radar range accuracy and resolution generally improve as the transmitted signal bandwidth is increased. In a pulse system, where the pulse modulates an R-F carrier, large transmitted bandwidths require very narrow pulses and therefore high peak to average power ratios. To overcome the high peak powers, pulse compression techniques have been developed where the carrier within a long pulse is modulated to achieve the required transmitted bandwidth. A simple method for achieving a large transmitted bandwidth is to linearly F-M and R-M carrier with a ramp. This method of modulation is attractive since range information is easily extracted by heterodyning the return echo with the transmitted F-M ramp. Assuming a fixed target for simplicity, the echo delay or range is directly proportional to the resultant frequency after heterodyning.

Compression ratio, as given below, is generally used as a figure of merit for radar accuracy and resolution capability. In utilizing this method, the equivalent compression ratio obtained for a single pulse is given by $$\text{Compression Ratio} = CR = \frac{B}{B_r} = BT_p$$

where B is the ramp deviation and $B_r$ is the receiver bandwidth. For a matched receiver system $$B_r = \frac{1}{T_p}$$

where $T_p$ is the pulse length. More generally, $T_p$ should be considered the integration time $T_n$ and B the transmitted bandwidth $B_t$. Then $$CR = B_t T_n$$

Therefore the larger $B_t T_n$ the better the accuracy and resolution. It is thus seen that the compression ratio of a ramp system can be increased by transmitting a very long pulse since both $T_n$ and $B_t$ will be increased (assuming a constant ramp slope). However, if the pulse is made longer than $2R/C$ where R is the minimum range, then transmission and reception must occur simultaneously. In many applications this is not desirable or practical.

Accordingly, it is an object of this invention to provide a ramp ranging system in which the equivalent of a long ramp is obtained by employing a series of short ramps.

In achieving the foregoing object, the present invention provides a phase coherent FM ramp ranging system in which the equivalent of a long ramp is obtained by generating a group of sequential short ramps and properly heterodyning the ramps before transmission.

The above-mentioned and other features and objects of this invention will become more apparent by reference to the following description taken in conjunction with the accompanying drawings, in which:

FIGURE 3 is a series of waveforms and mathematical expressions illustrating the method of obtaining a long ramp equivalent by properly heterodyning a series of short ramps;

FIGURE 4 is a block diagram illustrating an alternate gating arrangement which can be employed in the system of FIGURE 1; and FIGURE 5 is a series of waveforms illustrating range resolution of the system of FIGURE 1.

Figure 1:
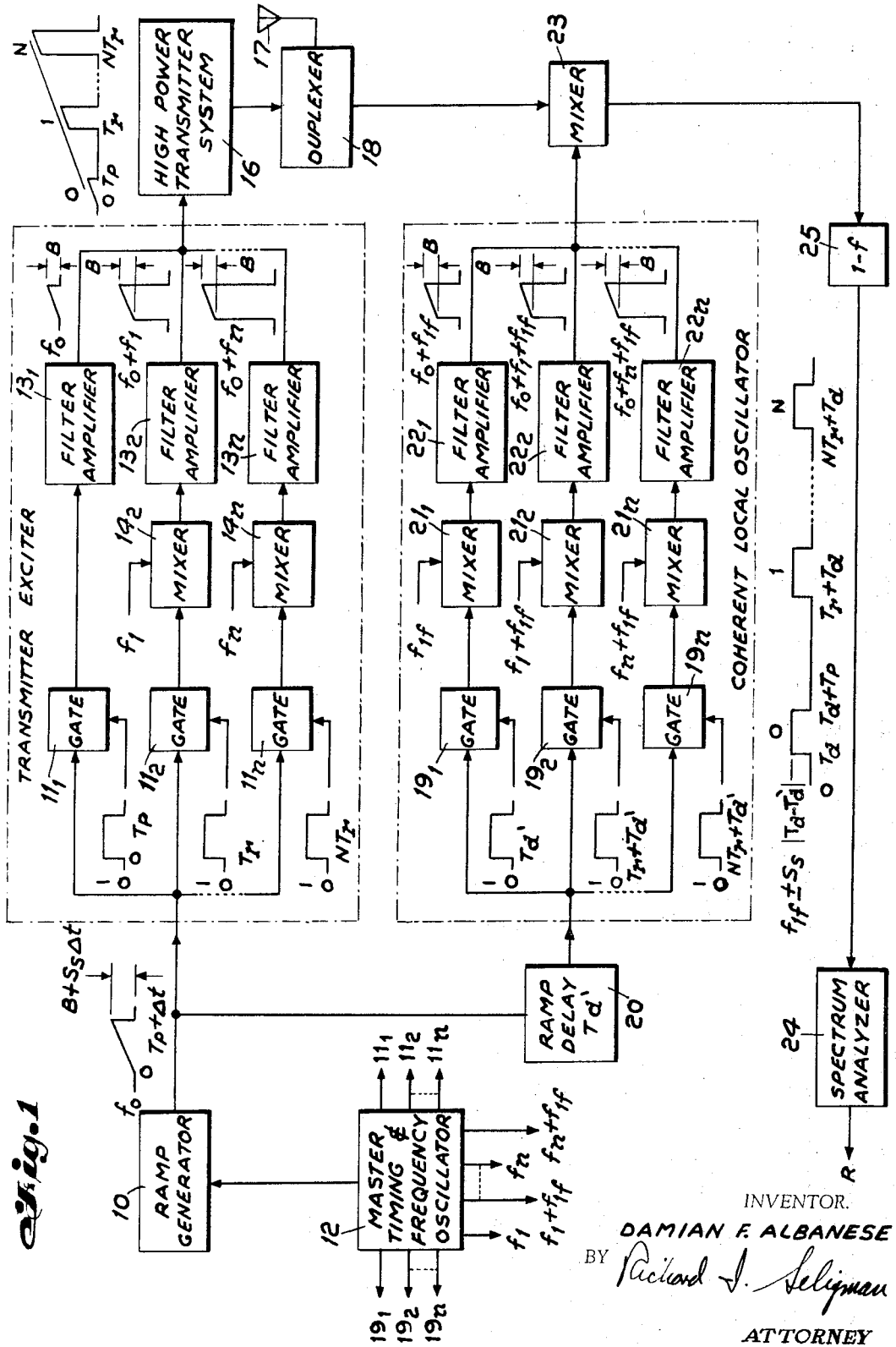
FIGURE 1 is a phase simplified block diagram illustrating a coherent ramp range measuring system according to the invention.

FIGURE 1 illustrates a practical embodiment employing the invention, comprising a ramp generator 10 the output of which is coupled to a plurality of gates $11_1$–$11_n$ which have as second inputs thereto outputs from a master timing and frequency oscillator 12. The output from gate $11_1$ is coupled to a filter amplifier $13_1$. The outputs from gates $11_2$–$11_n$ are coupled to corresponding filter amplifiers $13_2$–$13_n$ via respective mixers $14_2$–$14_n$; mixers $14_2$–$14_n$ having as second inputs thereto outputs from master timing and frequency oscillator 12 as indicated in the figure. The outputs from filter amplifiers 13 are transmitted by a high power transmitter system 16 employing an antenna 17 via a duplexer 18.

Ramp generator 10 is also coupled to a second set of gates $19_1$–$19_n$ via a delay 20. Gates 19 have as second inputs thereto outputs from master timing and frequency oscillator 12 as indicated in FIGURE 1. The outputs from gates 19 are coupled to corresponding mixers 21 which employ outputs from master timing and frequency oscillator 12 as second inputs thereto. Mixers 21 are coupled to respective filter amplifiers 22 the outputs from which are applied to a mixer 23 as are echos received by antenna 17 via duplexer 18. The output from mixer 23 is applied to a spectrum analyzer 24 via an I-F amplifier 25.

Figure 2:
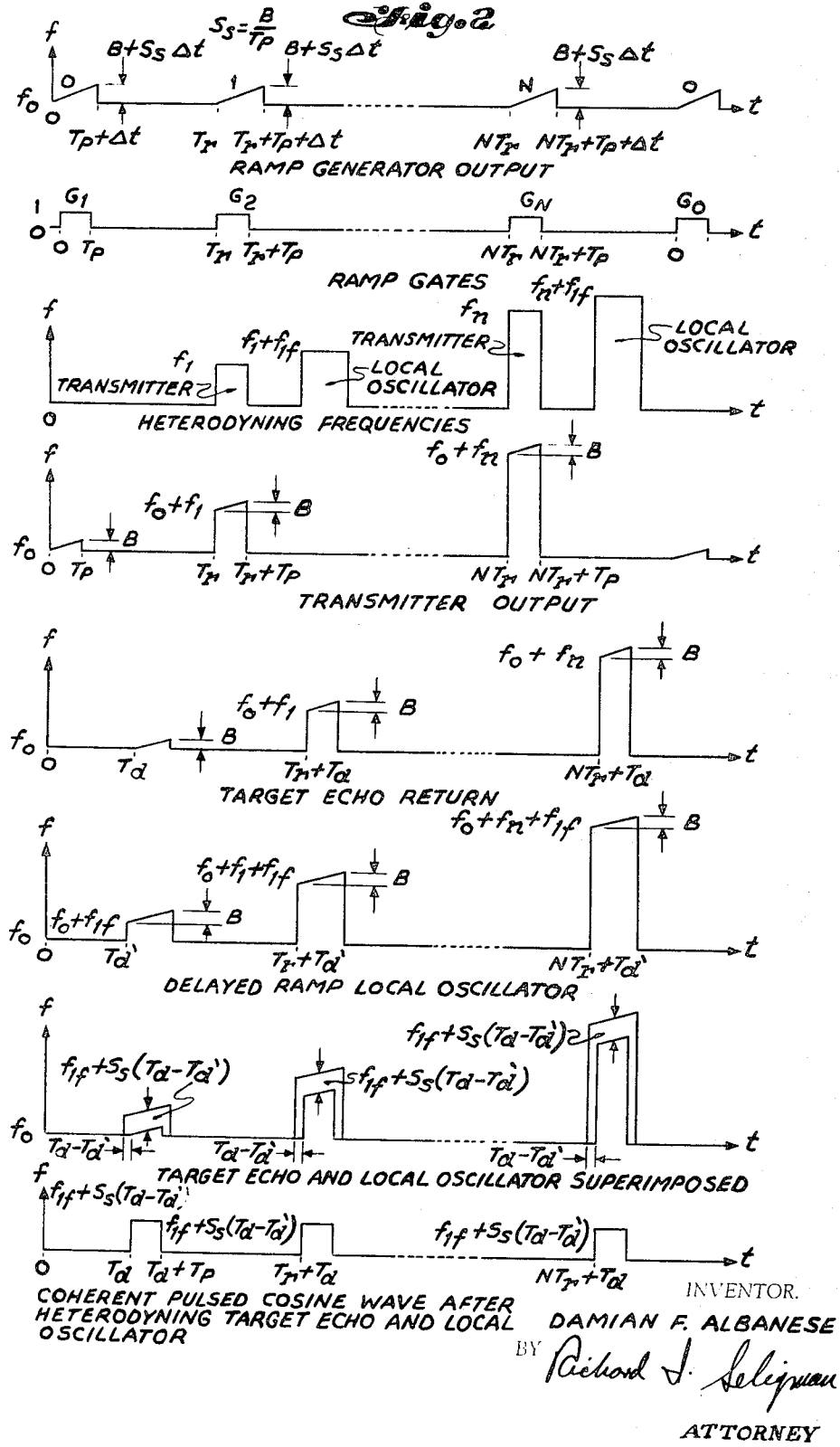
FIGURE 2 is a series of frequency-time diagrams of the system of FIGURE 1.

The operation of the embodiment of FIGURE 1 is described with the aid of the timing diagrams of FIGURE 2. Ramp generator 10 produces a linear frequency ramp of slope $$\frac{B}{T_p}$$

and length $T_p + \Delta t$. B is the deviation of the ramp during the transmitted pulse length $T_p$. The reason for making the ramp length greater than $T_p$ will be clear when the receiver is discussed hereinafter. The ramp is fed to a group of N gates $11_1$–$11_n$ in parallel. The gates are opened sequentially at the PRF period $T_r$ and for a time equal to $T_p$. Therefore the length of the gated ramp is $T_p$ and its deviation is B. The output of gates $11_2$–$11_n$ are fed to respective mixers $14_2$–$14_n$ where they are heterodyned with the proper frequency to obtain an equivalent long ramp. This method of generating a long ramp is graphically illustrated in FIG. 3. The outputs from gate $11_1$ and mixers $14_2$–$14_n$ are fed to filter amplifiers $13_1$–$13_n$ which select only the upper sidebands. All the filter amplifier outputs are fed to the high power transmitter system 16 which amplifies and sends the signal to antenna 17 via duplexer 18. Note that each parallel path requires a bandwidth of B whereas the high power transmitter-duplexer requires a bandwidth of approximately $$S_s T_n = \frac{B}{T_p} N T_r$$

The target echo returns to mixer 23 via antenna 17 and duplexer 18 where it is heterodyned with a delayed L.O. ramp. Each delayed ramp has been heterodyned with the same frequency as its corresponding transmitted ramp plus an I-F frequency. The method of obtaining the delay is shown as physical delay line, however, in certain applications it may be more practical to generate a new ramp at the proper time. If this latter method is used, it will be necessary to start the transmitted and L.O. ramps with the same phase. The delayed L.O. ramp has been made slightly greater than the transmitted pulse in order to insure that complete overlap is obtained with the echo ramp. In effect the delayed ramp can be considered a range gate which is slightly larger than the echo pulse. The heterodyning frequencies in the local oscillator are taken from the same source as the transmitter exciter frequencies in order to maintain coherence. The result after mixing the target echo and the delayed local oscillator ramp, is a coherent pulsed sinewave (see FIG. 5). This is fed into spectrum analyzer 24. Spectrum analyzer 24 gives the frequency spectrum of the input time function. Therefore the frequency of the input pulsed sinewave is determined. The spectrum center frequency is a measure of the relative positions of the delayed ramp and the echo ramp. This information plus the L.O. ramp deay $T_{d'}$ gives the total echo delay $T_d$ or target range. Expressed mathematically $$T_d = T_{d'} + f_r/S_s; \text{ where } f_r = S_s(T_d - T_{d'})$$

An alternate method of performing the gating for the embodiment of FIGURE 1 is shown in FIGURE 4. In this arrangement the output from ramp generator 10 is applied to a mixer 26 which has as a second input thereto the outputs from a plurality of gates $27_1$–$27_n$, the inputs thereto being derived from master timing and frequency oscillator 12. The output of mixer 26 is coupled to a filter amplifier 28 with the output therefrom being applied to the transmitter. The output from ramp generator 10 is also applied to another mixer 29 via a delay 30. Mixer 29 has second inputs thereto from a plurality of gates $31_1$–$31_n$ which have as inputs thereto outputs from master timing and frequency oscillator 12 as illustrated. The output from mixer 29 is applied to filter amplifier 31 with the output therefrom applied to mixer 23 (FIG. 1) for heterodyning with the incoming echo signals.

The spectrum of the coherent pulses of sinewave resulting after heterodyning with the echo and transmitted ramps is shown in FIGURE 5. The I-F frequency has been removed for simplicity and therefore the spectrum is centered at $$f_T = S_s |T_d - T_{d'}|$$

The spectrum consists of a group of $$\frac{\sin X}{X}$$

narrow spectra within an envelope of a wide $$\frac{\sin X}{X}$$

curve. The wide envelope shape corresponds to the spectrum of a single pulse of length $T_p$, whereas the shape of the narrow spectra correspond to the spectrum of a pulse of length $T_n \approx NT_r$. If two ramps of length $T_n$ and slope $$\frac{B}{T_p}$$

were heterodyned, the resultant sinewave would have a spectrum consisting of only the central narrow spectrum (except that the peak voltage would be greater). Thus the described system has a resolution which is the equivalent of a ramp of deviation $$B_t = \frac{B}{T_p} \cdot NT_r$$

In the description of the above system, target Doppler has not been considered. The Doppler tends to cause a range error unless a correction is made. A way of correcting this is to measure the Doppler (by transmitting unmodulated pulses) before making the range measurements and then offsetting the range signal frequency a corresponding amount.

A unique feature of the system is that the modulation bandwidth per pulse B can be reduced as the integration time is increased. The total required transmitted bandwidth $B_t$ is achieved simply by heterodyning successive pulses. This is of importance since it eases considerably the requirement of the transmitter modulator and possibly the high power transmitter system.

For example, it may be more advantageous to use N transmitters of bandwidth B than one transmitter of bandwidth $B_t$. Thus, it is to be understood that the embodiments shown are to be regarded as illustrative only, and that many variations and modifications may be made without departing from the principles of the invention herein disclosed and defined by the appended claims.

I claim:

1. A coherent FM ramp ranging system, comprising:
   means for generating a first plurality of short frequency ramps equivalent to portions of a long frequency ramp;
   means for transmitting said first plurality of short frequency ramps;
   means for receiving an echo of said transmitted first plurality of ramps;
   means for generating a second plurality of short frequency ramps equivalent to portions of a long frequency ramp;
   means for heterodyning said received echo of said first plurality of ramps with said second plurality of ramps to produce a coherent pulsed sinewave; and
   means for determining the frequency of said coherent pulsed sinewave, said frequency being a measure of the relative positions of said first and second pluralities of ramps and being proportional to target range.

2. A coherent FM ranging system as in claim 1 wherein said means for generating a first plurality of short frequency ramps includes:
   a ramp generator for generating short frequency ramps;
   a plurality of gates having first and second inputs and an output, said first inputs being coupled to said ramp generator;
   means for generating a plurality of gate enabling pulses having predetermined pulse lengths and a predetermined repetition rate;
   means for sequentially coupling said gate enabling pulses to said second inputs to said plurality of gates; and
   a plurality of mixers coupled to all but said first enabled gates.

3. A coherent FM ranging system as in claim 2 further including means for generating a plurality of frequencies and for applying respective ones of said frequencies to said mixers.

4. A coherent FM ranging system as in claim 2, further including a plurality of filter amplifiers, one coupled to said first gate and to each of said mixers for selecting only the upper sidebands.

5. A coherent FM ranging system as in claim 1, wherein said second plurality of short frequency ramps is delayed a predetermined period of time prior to being heterodyned with said first plurality of ramps.

6. A coherent FM ranging system as in claim 1 wherein said means for generating a first plurality of short frequency ramps includes:
   a ramp generator for generating short frequency ramps;
   a plurality of gates each having an input and an output;
   means for generating a plurality of frequencies and for applying respective ones of said frequencies to the inputs to said gates; and
   a mixer having first and second inputs and an output said first input coupled to said ramp generator and said second input to the outputs of said plurality of gates.

7. A coherent FM ramp ranging system according to claim 1 wherein said first plurality of short frequency ramps are equivalent to different portions of a long frequency ramp and wherein said second plurality of short frequency ramps are equivalent to corresponding different portions of said long frequency ramp.

8. A coherent FM ramp ranging system according to claim 1 wherein said long frequency ramps have a substantially linear frequency versus time characteristic.

9. A coherent FM ramp ranging system according to claim 1 wherein said frequency determining means includes a spectrum analyzer.

References Cited

UNITED STATES PATENTS

| 3,110,897 | 11/1963 | Laurent | 343—13 |
| 3,142,058 | 7/1964 | Rhodes | 343—13 |
| 3,188,637 | 6/1965 | Mortley | 343—14 XR |
| 3,263,227 | 7/1966 | Ferry et al. | 343—17.2 XR |
| 3,299,427 | 1/1967 | Kondo | 343—17.1 |

RODNEY D. BENNETT, *Primary Examiner.*

J. P. MORRIS, *Assistant Examiner.*